(12) United States Patent
Iyanagi

(10) Patent No.: US 10,279,555 B2
(45) Date of Patent: May 7, 2019

(54) MOLDING DRUM

(71) Applicant: BRIDGESTONE CORPORATION, Tokyo (JP)

(72) Inventor: Satoshi Iyanagi, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 83 days.

(21) Appl. No.: 14/771,641

(22) PCT Filed: Feb. 26, 2014

(86) PCT No.: PCT/JP2014/054769
§ 371 (c)(1),
(2) Date: Aug. 31, 2015

(87) PCT Pub. No.: WO2014/141885
PCT Pub. Date: Sep. 18, 2014

(65) Prior Publication Data
US 2016/0023415 A1    Jan. 28, 2016

(30) Foreign Application Priority Data
Mar. 12, 2013   (JP) .................. 2013-049496

(51) Int. Cl.
*B29D 30/26* (2006.01)
*B29D 30/24* (2006.01)

(52) U.S. Cl.
CPC .......... *B29D 30/26* (2013.01); *B29D 30/242* (2013.01); *B29D 30/245* (2013.01); *B29D 2030/2642* (2013.01); *B29D 2030/2657* (2013.01)

(58) Field of Classification Search
CPC ...... B29D 2030/2642; B29D 2030/265; B29D 2030/2657; B29D 30/26
See application file for complete search history.

(56) References Cited

U.S. PATENT DOCUMENTS 3,761,340 A * 9/1973 Klein ............... B29D 30/2607
156/397
4,268,330 A   5/1981 Komatsu et al.
(Continued)

FOREIGN PATENT DOCUMENTS

JP   S49-25075 A    3/1974
JP   S50-157477 A  12/1975
(Continued)

OTHER PUBLICATIONS

Machine generated English language translation of JP 61-57334 (original document dated Mar. 1986).*
(Continued)

*Primary Examiner* — Geoffrey L Knable
(74) *Attorney, Agent, or Firm* — Oliff PLC

(57) ABSTRACT

Even when a radial length of a swing arm is increased, no gap is generated between adjacent segments, and tires of various sizes can be handled while roundness of a drum is maintained. An expandable molding drum has a plurality of segments constituting a circumferential surface, the molding drum having a plurality of swing arms having one end portion swingably connected to an outer circumferential surface of a cylindrical slider externally fitted with a drum shaft and having the other end portion swingably connected to the segment and expanding/contracting the segment along with movement of the slider in a drum shaft direction, and adjacent end portions of one end portions of the swing arms being swingably connected to the outer circumferential surface of the slider at intervals from each other in the drum shaft direction.

6 Claims, 4 Drawing Sheets

(56) References Cited

U.S. PATENT DOCUMENTS

| | | | |
|---|---|---|---|
| 4,521,269 A | 6/1985 | Ozawa | |
| 5,269,870 A * | 12/1993 | Mori | B29D 30/242 |
| | | | 156/417 |
| 5,618,374 A * | 4/1997 | Byerley | B29D 30/242 |
| | | | 156/418 |
| 2004/0050499 A1 | 3/2004 | Barody | |
| 2004/0244914 A1* | 12/2004 | Byerley | B29D 30/244 |
| | | | 156/417 |
| 2012/0073728 A1 | 3/2012 | Takasuga | |
| 2012/0168087 A1 | 7/2012 | Byerley | |

FOREIGN PATENT DOCUMENTS

| | | | | |
|---|---|---|---|---|
| JP | S53-57283 A | | 5/1978 | |
| JP | S55-91646 A | | 7/1980 | |
| JP | 59-216702 | * | 6/1984 | ............ B60B 21/00 |
| JP | 61-57334 | * | 3/1986 | ............ B29D 30/24 |
| JP | H06-344465 A | | 12/1994 | |
| JP | 2001-315218 | * | 11/2001 | ............ B29D 30/24 |
| JP | 2002-028986 A | | 1/2002 | |
| JP | 2004/520194 A | | 7/2004 | |
| JP | 2007-038581 A | | 2/2007 | |
| JP | 2009-274392 A | | 11/2009 | |
| JP | 2012-24988 | * | 2/2012 | ............ B29D 30/24 |
| SU | 483279 A2 | | 9/1975 | |
| SU | 555615 A1 | | 3/1991 | |
| SU | 1735045 A1 | | 5/1992 | |
| WO | 2010/140485 A1 | | 12/2010 | |

OTHER PUBLICATIONS

Machine generated English language translation of JP 59-216702 (original document dated Dec. 1984).*

Machine generated English language translation of JP 2001-315218 (original document dated Nov. 2001) (Year: 2001).*

Machine generated English language translation of JP 2012-24988 (original document dated Feb. 2012) (Year: 2012).*

Feb. 8, 2016 extended Search Report issued in European Patent Application No. 14763014.9.

Mar. 25, 2014 International Search Report issued in International Patent Application No. PCT/JP2014/054769.

Dec. 27, 2016 Office Action issued in Russian Patent Application No. 2015143205.

* cited by examiner

MOLDING DRUM

TECHNICAL FIELD

The present invention relates to a molding drum capable of expansion/contraction (expandable molding drum), for example, a tire molding drum, or particularly to a molding drum in which an expansion/contraction stroke in expansion/contraction can be set longer than that of a prior-art molding drum.

BACKGROUND ART

As a molding drum, for example, a tire molding drum (in the following description, referred to simply as a drum), there is known a drum in which its circumferential surface is constituted by a plurality of segments which is divided, each segment is mounted at a tip end of a plurality of expandable arms radially extending from a center axis of the drum, and a tire constituent member is molded so that a gap is not generated between the segments when the arm is extended.

When such a drum is used, there is no problem as long as an inner diameter of a tire to be molded has such a size that a gap is not generated between the segments, but a gap is naturally generated between the segments.

When a gap is generated between the segments, there occurs a failure such as a defect in uniformity of a product tire or such that the tire constituent member wrapped around the drum falls into the gap.

Accordingly, a plurality of types of tire constituent members with different tire sizes (inner diameters) cannot be molded using one drum.

Therefore, conventionally, a drum fitted with a tire size for every tire different size is prepared, and the drum is selected each time the tire size is changed.

However, in this method, in addition to an aspect of cost by preparation of a plurality of types of drums, there is generated a work of changing the drum each time the tire size is changed, which becomes a hindrance factor of productivity enhancement in molding of the tire constituent member.

As a measure against this problem, for example, there is known a drum that is provided with first and second segments having different circumferential lengths, and that can be used for molding two tire constituent members with different inner diameters by making a selection from two drum diameters, that is, a drum surface having a first diameter formed by the first segment and a drum surface having a second diameter formed by the second segment (refer to PTL 1).

However, a drum configuration of Patent Literature 1 can be applied only to molding of two tires each having different inner diameter, and its effect is limited.

CITATION LIST

Patent Literature

PTL 1: Japanese Patent Laid-Open No. 06-344465

SUMMARY OF INVENTION

Technical Problem

The present invention has been made in view of the above-described problem in the prior-art drum and its object is to enable handling of tires of various sizes while maintaining roundness of a drum, without generating a gap between adjacent segments even when a radial length of a swing arm is increased.

Solution to Problem

The invention of claim 1 is an expandable molding drum having a plurality of segments constituting a circumferential surface, in which the molding drum has a plurality of swing arms having one end portion swingably connected to an outer circumferential surface of a cylindrical slider externally fitted with a drum shaft and having the other end portion swingably connected to the segment, respectively, includes a plurality of segment expansion/contraction mechanisms constituted by the plurality of swing arms at intervals along the drum shaft, and is expanded/contracted by the plurality of segment expansion/contraction mechanisms along with movement of the slider in a drum shaft direction.

The invention of claim 2 is, in the molding drum according to claim 1, a molding drum further including: a fixing member mounted on the drum shaft; and a plurality of guide members for guiding the other end portion of the swing arms in a radial direction of the drum shaft, on the fixing member.

The invention of claim 3 is, in the molding drum according to claim 2, a molding drum in which the guide members are arranged at intervals in the drum shaft direction with respect to the fixing member.

The invention of claim 4 is, in the molding drum according to claim 3, a molding drum in which the fixing member includes a first fixing member and a second fixing member mounted on the first fixing member at intervals in an axial direction with respect to the first fixing member; and the first fixing member guides the other end portion of a swing arm of one of segment expansion/contraction mechanisms adjacent to each other along the drum shaft, and the second fixing member guides the other end portion of the swing arm of the other of segment expansion/contraction mechanisms.

The invention of claim 5 is, in the molding drum according to any of claims 1 to 4, a molding drum in which the slider is connected to a reciprocating middle shaft arranged in the drum shaft via a slit of the drum shaft.

Advantageous Effects of Invention

According to the invention of claim 1, the plurality of segment expansion/contraction mechanisms constituted by the plurality of swing arms is provided at intervals along the drum shaft, and expansion/contraction is performed by the plurality of segment expansion/contraction mechanisms along with movement of the slider in the drum shaft direction, and thus a plurality of rows of the swing arms can be expanded/contracted with respect to the one slider. As a result, even when the radial length of the swing arm is increased, a gap is not generated between the adjacent segments, and the tires of various sizes can be handled while roundness of the drum is maintained.

According to the invention of claim 2, since the plurality of guide members for guiding the other end portion of the swing arms in the radial direction of the drum shaft is provided on the fixing member mounted on the drum shaft, the swing arm can be smoothly expanded/contracted and at the same time, the length in the drum shaft direction can be reduced as compared with, for example, the case where a link mechanism is provided at the other end of the swing arm, and a device can be made compact.

According to the invention of claim 3, since the guide members are arranged at intervals in the drum shaft direction with respect to the fixing member, more swing arms than ever before can be smoothly expanded/contracted.

According to the invention of claim 4, since the fixing member is composed of the first and second fixing members, and in the slider outer circumferential direction, the end portions of the plurality of swing arms adjacent are guided by the first and second fixing members, respectively, expansion/contraction of the swing arm can be performed with accuracy, and a size of an entire drum can be made compact. Furthermore, expansion/contraction of many swing arms can be performed by using a simple facility.

According to the invention of claim 5, since a shaft (middle shaft) reciprocating the slider is arranged in the drum shaft, the slider can be slid with a compact configuration.

DESCRIPTION OF EMBODIMENTS

Next, an embodiment of the present invention will be described by referring to the attached drawings.

Figure 1:
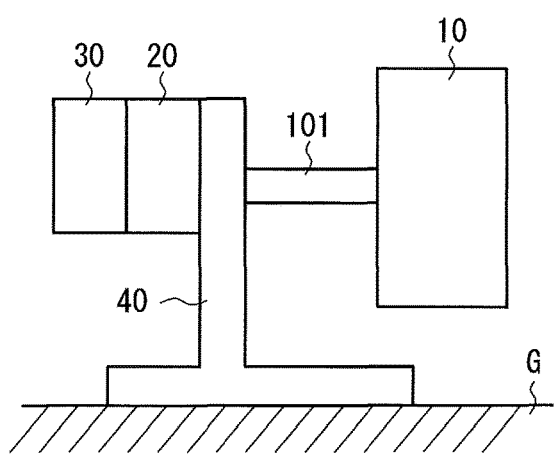
FIG. 1 is a view schematically illustrating a tire molding device provided with a drum according to an embodiment of the present invention.

FIG. 1 is a view schematically illustrating a tire molding device provided with a drum according to the embodiment of the present invention.

The tire molding device includes, as schematically illustrated in FIG. 1, a drum 10 and a rotating mechanism 20 rotating the drum 10, a middle-shaft driving mechanism 30 for reciprocating a middle shaft 105 (FIG. 3) which is arranged concentrically in a rotating shaft 101 of the drum 10 (hereinafter referred to as a drum shaft) and will be described later, and a supporting portion 40 for supporting an entirety on a floor surface G.

Here, the rotating mechanism 20 is arbitrary as long as the mechanism can rotate and drive the drum 10 and is a known mechanism such as a mechanism for transmitting rotation of a driving motor to a drum shaft 101. Furthermore, a known linear motion mechanism such as a cylinder mechanism or a screw transmission mechanism can be used as the middle-shaft driving mechanism 30.

Figure 2:
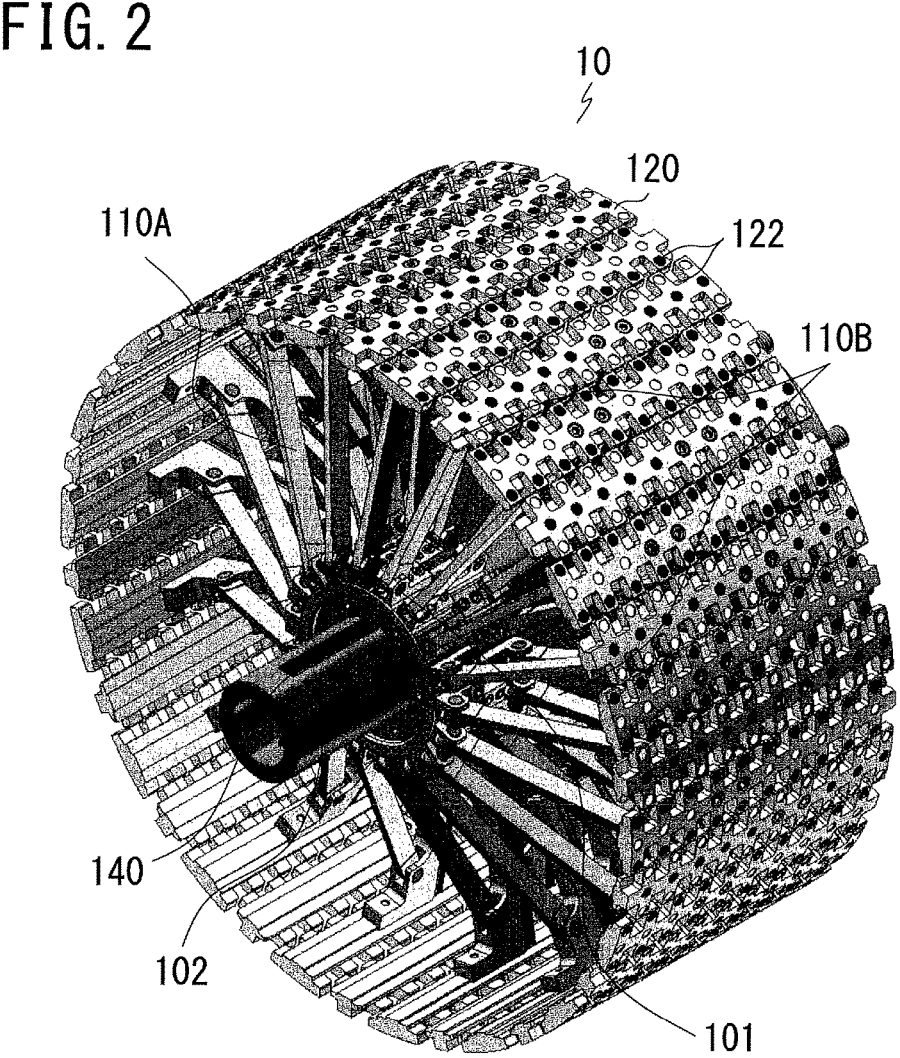
FIG. 2 is a perspective view of the drum according to the embodiment of the present invention.

The drum 10 includes, as illustrated its entirety in the perspective view in FIG. 2, a plurality of swing arms 110A and 110B arranged around the drum shaft 101 and at regular intervals alternately in two rows back and forth along the drum shaft 101, and a segment 120 mounted at a tip end of each of the swing arms 110A and 110B.

Each of the segments 120 has an arc-shaped upper surface so as to constitute a circumferential surface by the segments 120 in their entirety, comb-teeth shaped irregularities (hereinafter, referred to as comb teeth) 122 being formed at both end portions on its drum circumferential direction side, and comb teeth 122 of adjacent segments 120 are meshed with each other to thereby constitute the continuous circumferential surface.

As to the swing arms 110A and 110B, one end portions thereof are swingably connected, at regular intervals, to a slider along a circumference of an outer circumferential surface of the cylindrical slider externally fitted with the drum shaft 101, and the other end portions are swingably connected to the segments, respectively. Each of the plurality of swing arms 110A and 110B constitutes an independent segment expansion/contraction mechanism, and the respective segment expansion/contraction mechanisms are arranged at intervals from each other along the drum shaft 101 as illustrated.

Note that, as will be described later, each of the segments 120 moves in a radial direction between a contracted position on an inner side in the radial direction and an expanded position on an outer side in the radial direction while maintaining a state where the comb teeth 122 of the adjacent segments 120 are meshed with each other, by swinging the swing arms 110A and 110B around the drum shaft 101 in the radial direction thereof.

Figure 3:
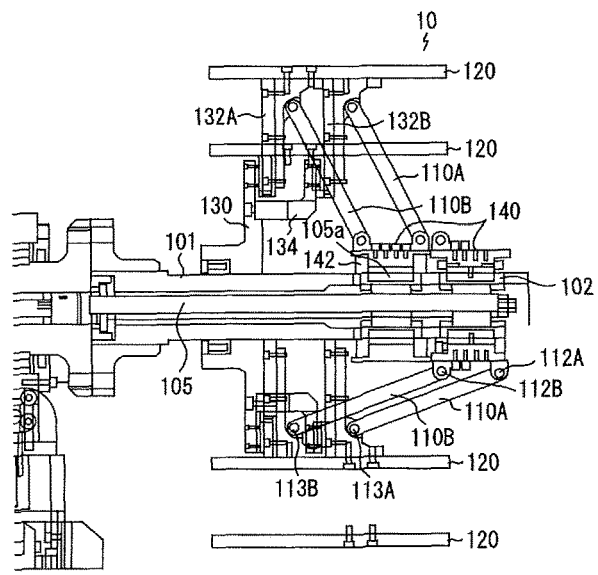
FIG. 3 is a cross-sectional view of the drum for explaining an expansion/contraction mechanism of the drum according to the embodiment of the present invention and an upper side in the figure illustrates an expanded diameter state and a lower side illustrates a contracted diameter state.

FIG. 3 is a cross-sectional view of the drum for explaining an expansion/contraction mechanism of the drum 10. An upper side in FIG. 3 illustrates an expanded diameter state of the drum 10 and a lower side illustrates a contracted diameter state.

The drum shaft 101 is constituted as a hollow pipe body as illustrated, and the middle shaft 105 is attached to its hollow portion so as to be capable of reciprocating by the middle-shaft driving mechanism 30 (FIG. 1).

A slider 140 forms a cylindrical shape and is externally fitted with the drum shaft 101 and includes a connecting portion 142 protruding inward from its inside (the connecting portion may be provided at, for example, 180-degree intervals or 90-degree intervals along an inner circumference of the slider 140, and the number of the connecting portion is arbitrary). Here, the connecting portion 142 penetrates a guide groove 102 formed along the drum shaft 101 and clamps (fixes) both sides of a portion of expanded diameter or a convex portion 105a of the middle shaft 105 so as to sandwich that portion. By this configuration, when the middle shaft 105 is reciprocated by the middle-shaft driving mechanism 30 along the drum shaft 101, its motion is transmitted to the slider 140 via the convex portion 105a and the connecting portion 142, and the slider 140 is reciprocated on the drum shaft 101.

Figure 4:
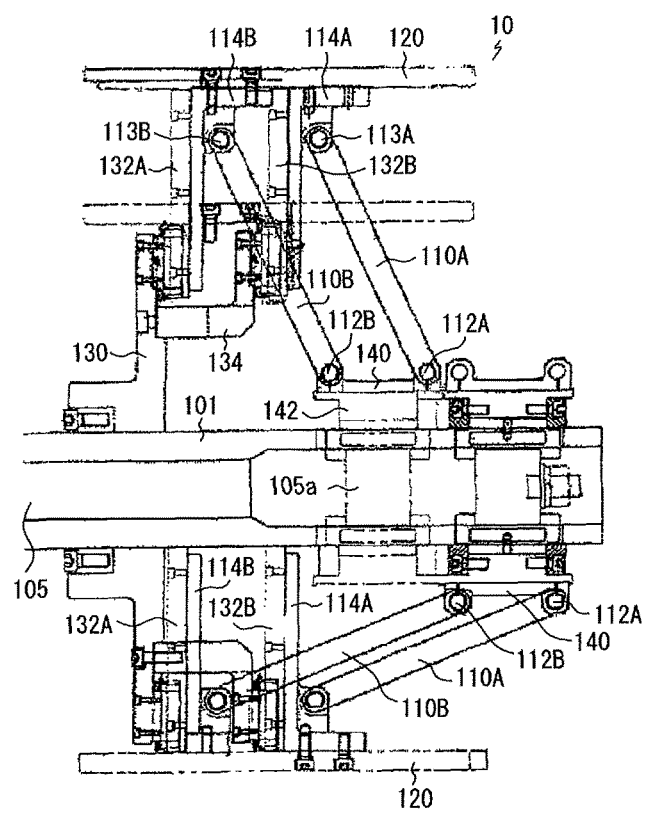
FIG. 4 is an enlarged view of an essential part of the drum illustrated in FIG. 3.

FIG. 4 is an enlarged view of an essential part of the drum 10 illustrated in FIG. 3.

One end portions of the swing arms 110A and 110B constituting the different segment expansion/contraction mechanisms, respectively, are pivotally attached to pins 112A and 112B which are arranged at intervals in a drum shaft direction of the slider 140, and at regular intervals along the circumference and with a phase (an angle) shifted from each other around the drum shaft, that is, alternately. Therefore, the swing arms 110A and 110B constituting the different segment expansion/contraction mechanisms, respectively, are arranged at regular intervals along a circumferential surface of the slider 140, and the one end portions of the swing arms 110A and 110B pivotally attached to the slider 140 are arranged alternately back and forth in the drum shaft direction.

At a position of the drum shaft 101 on the left side of the slider 140 in FIG. 4, an annular body 130 which is a first fixing member serving as a fixing member is integrally mounted by being screwed, for example, on the drum shaft 101 in a state where the drum shaft 101 is inserted into a center hole of the annular body 130. A plurality of guide rails 132A being guide members and extending in a radial direction is mounted on an outer side surface of this annular body 130 in the radial direction, at regular intervals (equal angle intervals) by using a screw or the like. Furthermore, an auxiliary annular body 134 being a second fixing member having an L-shaped section is mounted on an inner side surface of the guide rail 132A of the annular body 130 in the radial direction by using, for example, a screw, and a plurality of guide rails 132B extending in the radial direction along its outer circumference is mounted also on a surface of this auxiliary annular body 134, at regular intervals (equal angle intervals) by using a screw or the like. Moreover, each of the guide rails 132A and 132B is arranged so that distances thereof from a shaft core of the drum shaft 101 become the same, respectively.

L-shaped brackets 114A and 114B connected by a screw or the like to a back surface of each segment 120 of the swing arms 110A and 110B, respectively, are slidably engaged with each of the guide rails 132A and 132B. Furthermore, an outer end portions (the other end portions) in the radial direction of the swing arms 110A and 110B are pivotally attached to side surfaces of the L-shaped brackets 114A and 114B opposite to sliding surfaces with the guide rails 132A and 132B, by using pins 113A and 113B, respectively.

Figure 5A:
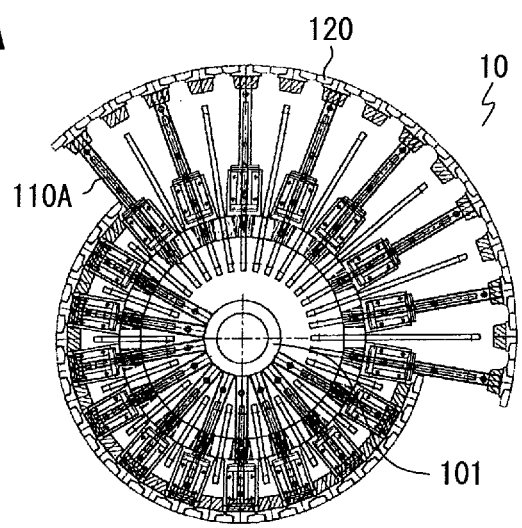
FIG. 5A is a side view of the drum in FIG. 4 when viewed from a right side in the figure, and in the figure, an upper right portion illustrates a state where a swing arm is expanded and a lower left portion illustrates a contracted state, respectively.

FIG. 5A is a side view of the drum 10 in FIG. 4 when viewed from a right side in the figure, and in the figure, an upper right portion illustrates a state where the swing arms 110A and 110B are expanded, and a lower left portion illustrates a contracted state, respectively.

Figure 5B:
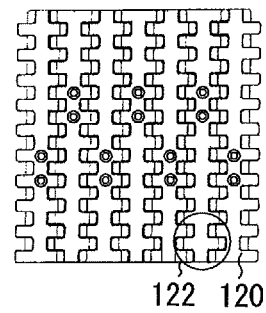
FIG. 5B is a view illustrating a surface of the drum illustrating a state where comb teeth of segments are meshed with each other to the deepest when the swing arm is contracted.

FIG. 5B is a view illustrating a surface of the drum 10 illustrating a state where the comb teeth 122 of the segments 120 are meshed with each other to the deepest when the swing arms 110A and 110B are contracted. In this state, the comb teeth 122 of the adjacent segments 120 are closely meshed with each other. The state of the comb teeth 122 of the segments 120 when the swing arms 110A and 110B are expanded is a state where there is a gap between the comb teeth 122 of the adjacent segments 120, but there is no gap between the segments 120, as illustrated in, for example, FIG. 2.

In the above-described configuration, when the middle-shaft driving mechanism 30 of the middle shaft 105 illustrated in FIG. 1 is operated, the middle shaft 105 is moved to the left in a state of a lower half of FIG. 4. When the middle shaft 105 is moved to the left, the connecting portion 142 of the slider 140 is also moved to the left integrally with the middle shaft 105 as described above.

Pivotally attached ends (one end portions) of the swing arms 110A and 110B with the pins 112A and 112B are moved to the left side by movement of the slider 140 to the left, but tip end portions in the radial direction (the other end portions) of the swing arms 110A and 110B are engaged with the guide rails 132A and 132B of the annular body 130 and the auxiliary annular body 134 fixed to the drum shaft 101 via the L-shaped brackets 114A and 114B, and thus movement to the left is prevented. As a result, the tip end portions in the radial direction of the swing arms 110A and 110B are moved (slided) toward the outer side in the radial direction along the guide rails 132A and 132B.

When the other end portions of the swing arms 110A and 110B are moved outward in the radial direction, the segments 120 are also moved outward in the radial direction via the L-shaped brackets 114A and 114B pivotally attached to them, and the diameter of the drum 10 is expanded. An upper half of FIG. 4 illustrates positions of the slider 140 and the swing arms 110A and 110B in the state where the diameter of the drum is expanded. The upper half of FIG. 4 illustrates the positions of the slider 140 and the swing arms 110A and 110B in a state where the diameter of the drum is expanded as described above.

According to the present embodiment, the adjacent end portions of the swing arms 110A and 110B conventionally arranged in a row in planes orthogonal to the drum shaft 101 direction along the circumference of the slider 140 are arranged alternately in two rows back and forth along the drum shaft 101 direction of the slider 140, and the segments 120 with the comb teeth 122 are provided at the respective tip end portions in the radial direction (the other end portions), and thus the segments 120 can be mounted to the one slider 140, at a density twice the conventional segments 120.

Therefore, roundness when each of the segments 120 is expanded is improved more than ever before. Accordingly, even when the segments are expanded larger than ever before, that is, even when an expansion/contraction stroke of the drum 10 is made larger than ever before, required roundness of each of the segments 120 can be maintained and can be used also for molding of a tire having a larger inner diameter.

According to the present embodiment, since the number of segments is increased up to two times that in the prior-art drum, a range of moldable tire sizes can be made wider than in the prior-art drum described in PTL 1.

Furthermore, the adjacent end portions of the one end portions of the swing arms are connected to the slider alternately and swingably at either one of the two positions at intervals in the drum shaft direction of the slider, respectively, and thus a balance of the drum itself is made stable, and molding of tires of various sizes can be handled with a small facility.

Furthermore, since the guide members are arranged at intervals in the drum shaft direction with respect to the fixing member, there can also be obtained an effect of being capable of secure expansion/contraction of the swing arm connected to the one slider, by using a smaller number of components and a simple facility.

In the above description, the swing arms are described to have a configuration of being arranged in two rows in a longitudinal direction of the slider (drum shaft direction), but is not necessarily limited thereto.

The swing arms may be arranged in, for example, three rows, and when the number of rows is increased, a structure becomes complicated, which leads to limitation, but the increase in the number of rows makes it possible to increase the number of segments by that amount, and roundness of the drum is further enhanced. Therefore, the expansion/contraction stroke of the drum by the swing arms can be further prolonged.

Furthermore, in the above description, the expansion/contraction mechanism of the swing arm has a structure provided with the fixing member (annular body 130) and the guide members (guide rails 132A and 132B), but the present invention is not limited to that. For example, a known link mechanism for expanding/contracting the swing arm can also be used.

REFERENCE SIGNS LIST 10 drum
20 rotating mechanism
30 middle-shaft driving mechanism
101 drum shaft
105 middle shaft
110A, 110B swing arm
112A, 112B, 113A, 113B pin
114A, 114B L-shaped bracket
120 segment
122 comb teeth
130 annular body
132A, 132B guide rail
134 auxiliary annular body
140 slider

The invention claimed is:

1. An expandable molding drum comprising:
a plurality of segments having comb teeth at both end portions on a drum circumferential direction side, the comb teeth of adjacent segments being meshed with each other to thereby form a continuous circumferential surface;
a plurality of swing arms, wherein each swing arm is connected to a respective one of the segments and is the only swing arm connected to the respective one of the segments;
a drum shaft;
a single cylindrical slider that is around the drum shaft;
a fixing member mounted on the drum shaft, the fixing member includes a first fixing member and a second fixing member that are connected to one another; and
a plurality of guide members for guiding a first end of the plurality of swing arms, which are connected to the guide members, in a radial direction of the drum shaft, on the fixing member, wherein:
the plurality of guide members includes a first plurality of guide rails extending in the radial direction and mounted on an outer side surface of the first fixing member in the radial direction, the plurality of guide members includes a second plurality of guide rails extending in the radial direction and mounted on a surface of the second fixing member at a distance in a drum shaft direction from the mounting surface of the first plurality of guide rails on the first fixing member, the second fixing member is mounted on an inner side surface of the first fixing member relative to the mounting location of the first plurality of guide rails in the radial direction, and the second fixing member is spaced from the drum shaft and mounted to the drum shaft via the first fixing member,
each swing arm of the plurality of swing arms has a second end swingably connected to an outer circumferential surface of the single cylindrical slider and having the first end swingably connected to the respective one of the segments,
a plurality of segment expansion/contraction mechanisms are formed by the plurality of swing arms, and the expandable molding drum is configured to be expanded/contracted by the plurality of segment expansion/contraction mechanisms along with movement of the single cylindrical slider in the drum shaft direction, and
the plurality of swing arms is arranged around the drum shaft at intervals alternately in two rows back and forth in the drum shaft direction.

2. The molding drum according to claim 1, wherein the plurality of guide members are arranged circumferentially around the drum shaft with respect to the fixing member.

3. The molding drum according to claim 2, wherein half of the swing arms of the plurality of swing arms are guided by the first fixing member and the other half of the swings arms of the plurality of swing arms are guided by the second fixing member.

4. The molding drum according to claim 2, wherein the single cylindrical slider is connected to a reciprocating middle shaft arranged in the drum shaft via a slit of the drum shaft.

5. The molding drum according to claim 3, wherein the single cylindrical slider is connected to a reciprocating middle shaft arranged in the drum shaft via a slit of the drum shaft.

6. The molding drum according to claim 1, wherein the single cylindrical slider is connected to a reciprocating middle shaft arranged in the drum shaft via a slit of the drum shaft.

* * * * *